US011880168B2

(12) United States Patent
Yahara

(10) Patent No.: US 11,880,168 B2
(45) Date of Patent: Jan. 23, 2024

(54) TIMEPIECE

(71) Applicant: CITIZEN WATCH CO., LTD., Tokyo (JP)

(72) Inventor: Yuji Yahara, Saitama (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 33 days.

(21) Appl. No.: 17/609,237

(22) PCT Filed: Mar. 30, 2020

(86) PCT No.: PCT/JP2020/014624
§ 371 (c)(1),
(2) Date: Nov. 5, 2021

(87) PCT Pub. No.: WO2020/235221
PCT Pub. Date: Nov. 26, 2020

(65) Prior Publication Data

US 2022/0214649 A1 Jul. 7, 2022

(30) Foreign Application Priority Data

May 20, 2019 (JP) ................................ 2019-094721

(51) Int. Cl.
*G04B 37/10* (2006.01)
*G04B 3/04* (2006.01)

(52) U.S. Cl.
CPC ........... *G04B 37/103* (2013.01); *G04B 3/041* (2013.01)

(58) Field of Classification Search
CPC ...... G04B 3/041; G04B 37/103; G04B 3/043; G04B 37/04; G04B 37/10; G04B 37/106; G04D 3/0012
See application file for complete search history.

(56) References Cited

U.S. PATENT DOCUMENTS 4,362,395 A 12/1982 Calabrese
9,052,696 B2 * 6/2015 Breuillot ................ G04B 3/046
(Continued)

FOREIGN PATENT DOCUMENTS

CH 242198 A 4/1946
CN 102004437 A 4/2011
(Continued)

OTHER PUBLICATIONS

China National Intellectual Property Administration, Office Action including Search Report for Chinese Patent Application No. 202080036954.1, Nov. 30, 2022 (a machine translation is attached hereto).

(Continued)

*Primary Examiner* — Edwin A. Leon

(57) ABSTRACT

A timepiece according to an embodiment enables a crown to be rotated even when it is locked, using a structure that does not cause constraints of design. The timepiece includes an outer case having a movement therein, the outer case having a crown hole through a portion thereof, an engagement member connected to the outer case, and a crown. The crown includes a shaft part inserted into the crown hole and connected to the movement, an operation part holding the shaft part movably along an axial direction of the shaft part and enabling the shaft part to rotate in a circumferential direction, and an engagement part disposed between the engagement member and the operation part and restricting movement of the operation part in the axial direction when engaged with the engagement member, the engagement part rotatably holding the operation part whether or not engaged with the engagement member.

7 Claims, 10 Drawing Sheets

(56) References Cited

U.S. PATENT DOCUMENTS

| | | | | |
|---|---|---|---|---|
| 9,836,025 | B2 * | 12/2017 | Ely | H01H 25/06 |
| 9,952,558 | B2 * | 4/2018 | Ely | G04B 27/02 |
| 11,194,298 | B2 * | 12/2021 | Roach | G04G 21/025 |
| 2010/0142333 | A1 | 6/2010 | Hiranuma et al. | |
| 2011/0051564 | A1 | 3/2011 | Hiranuma et al. | |
| 2015/0023142 | A1 | 1/2015 | Breuillot et al. | |
| 2015/0043314 | A1 | 2/2015 | Hiranuma et al. | |

FOREIGN PATENT DOCUMENTS

| | | | |
|---|---|---|---|
| DE | 4318758 | C1 | 8/1994 |
| EP | 1124167 | B1 | 4/2020 |
| FR | 2919078 | A1 | 1/2009 |
| JP | S56-89078 | A | 7/1981 |
| JP | 2010-127682 | A | 6/2010 |
| JP | 2010-139400 | A | 6/2010 |

OTHER PUBLICATIONS

WIPO, International Search Report for International Patent Application No. PCT/JP2020/014624, dated Jul. 7, 2020.

WIPO, International Preliminary Report on Patentability including Written Opinion for International Patent Application No. PCT/JP2020/014624, dated Jul. 7, 2020.

EPO, Extended European Search Report for European Patent Application No. 20809386.4, dated Jan. 23, 2023.

China National Intellectual Property Administration, Office Action including Search Report for Chinese Patent Application No. 202080036954.1, dated May 30, 2023 (a machine translation is attached hereto).

* cited by examiner

TIMEPIECE

FIELD

The present invention relates to a timepiece.

BACKGROUND

Timepieces including a crown have been available. In such a timepiece, the crown is connected to a movement via a stem. Rotary power generated by rotation of the crown is transmitted to the movement to wind a mainspring of the movement, driving the timepiece. The crown of such a timepiece can be pulled out, and is rotated in a pulled state by a user of the timepiece to perform, for example, an operation for setting the time.

To prevent an operation that a user does not intend from being performed, some of such timepieces lock the crown into an outer case with a screw structure to restrict pulling out the crown. However, a user needs to unlock and then rotate the crown every time the mainspring is wound, and may find it troublesome. Patent Literature 1 describes a timepiece that can wind a mainspring by rotating a crown even when the crown is locked by a screw structure.

CITATION LIST

Patent Literature

Patent Literature 1: Japanese Unexamined Patent Publication No. 2010-139400

SUMMARY

However, the timepiece described in Patent Literature 1 includes a guard part for locking the crown and an operation part for rotating the crown, and the operation part is provided closer to an outer case than the guard part, separately from the head of the crown. This increases the number of components, imposing constraints of design on the timepiece described in Patent Literature 1.

A timepiece according to an embodiment enables a crown to be rotated even when it is locked, using a structure that does not cause constraints of design.

The timepiece according to an embodiment includes an outer case having a movement therein, the outer case having a crown hole through a portion thereof; an engagement member connected to the outer case; and a crown. The crown includes a shaft part inserted into the crown hole and connected to the movement; an operation part holding the shaft part movably along an axial direction of the shaft part and enabling the shaft part to rotate in a circumferential direction; and an engagement part disposed between the engagement member and the operation part and restricting movement of the operation part in the axial direction when engaged with the engagement member, the engagement part rotatably holding the operation part whether or not engaged with the engagement member.

The engagement member in the timepiece according to an embodiment is preferably formed integrally with the outer case.

The engagement member in the timepiece according to an embodiment is preferably formed separately from the outer case.

The engagement part in the timepiece according to an embodiment preferably engages with the engagement member by screwing.

The engagement part in the timepiece according to an embodiment preferably rotatably holds the operation part with a fastening structure formed between an inner circumference of the engagement part and the operation part.

The engagement part in the timepiece according to an embodiment preferably rotatably holds the operation part with a barbed structure formed between an outer circumference of the engagement part and the operation part.

The crown in the timepiece according to an embodiment is preferably configured to be capable of winding a mainspring of the movement by rotation when the engagement part is engaged with the engagement member, and configured to be capable of rotating, by rotation, a hand connected to the movement when engagement between the engagement part and the engagement member is released and the crown is pulled out.

The timepiece according to an embodiment enables a crown to be rotated even when it is locked, using a structure that does not cause constraints of design.

The objects and advantageous effects of the present invention will be understood and achieved by means of components and combinations thereof mentioned, in particular, in the claims. Both the foregoing general and the following detailed descriptions are illustrative and explanatory ones, and do not limit the invention described in the claims.

DESCRIPTION OF EMBODIMENTS

Hereinafter, various embodiments of the present invention will be described with reference to the drawings. However, note that the technical scope of the present invention is not limited to these embodiments and includes the invention described in the claims and equivalents thereof.

First Embodiment

Figure 1:
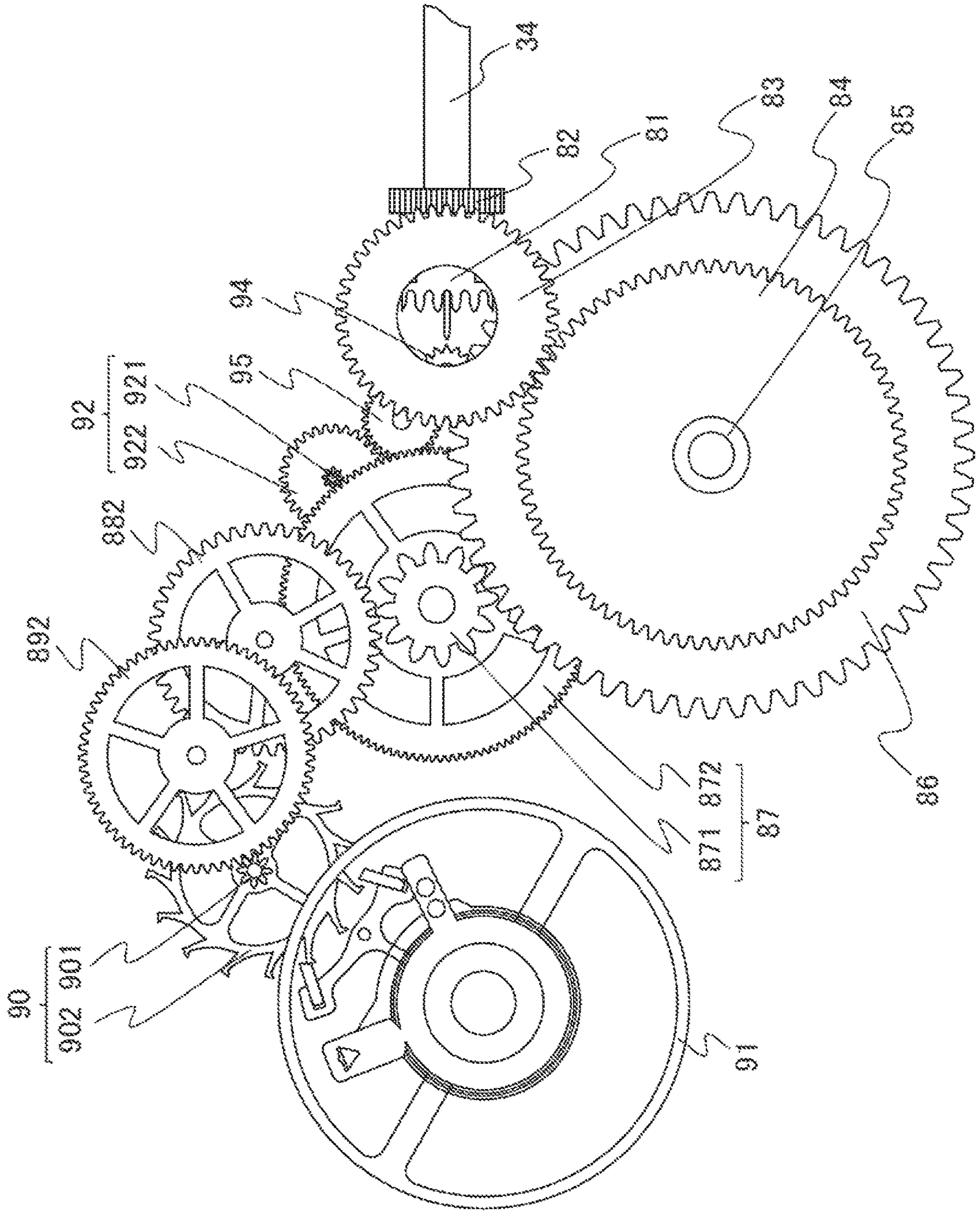
FIG. 1 is a front view of a movement 8.
Figure 2:
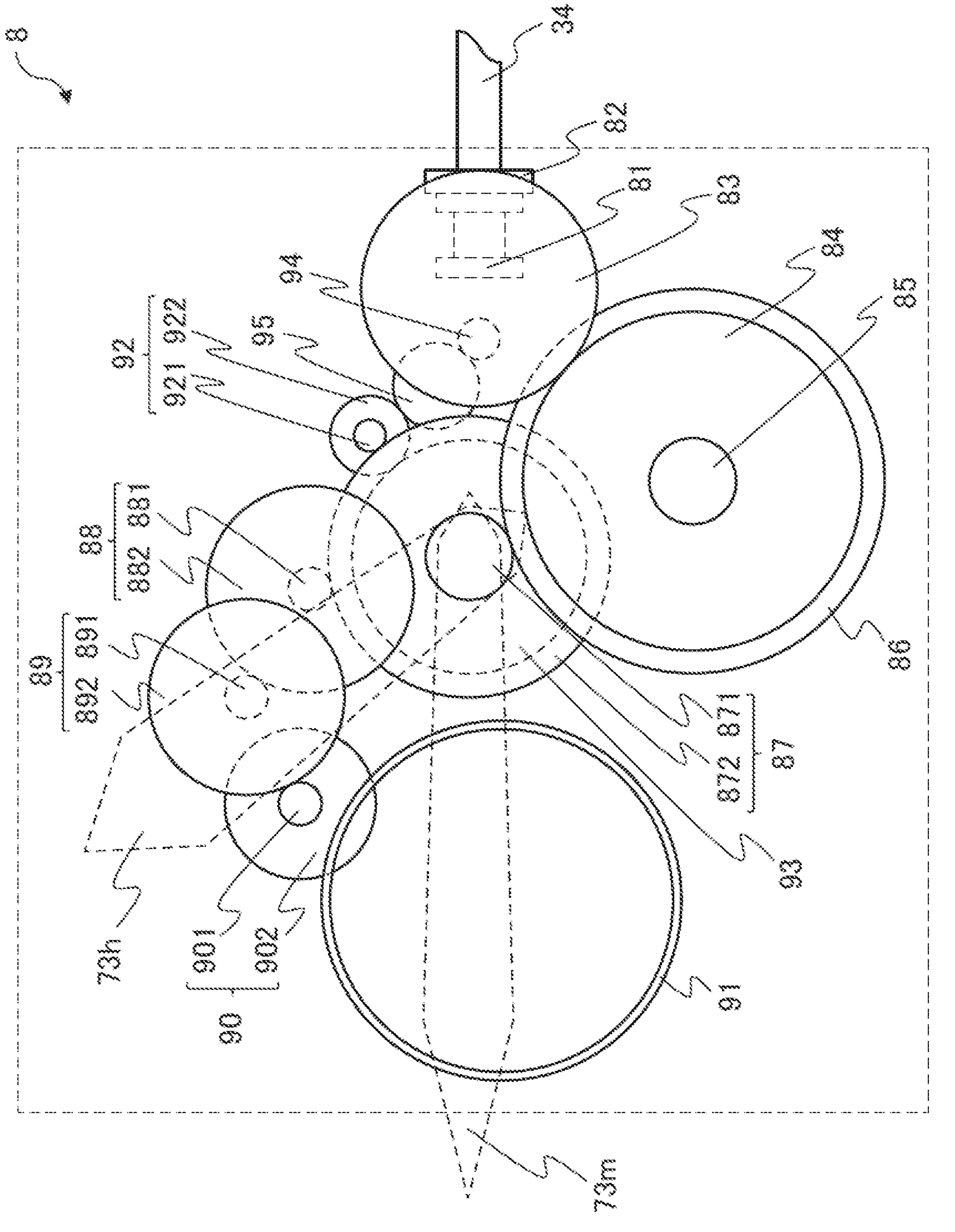
FIG. 2 is a schematic diagram for briefly describing the movement 8.

FIG. 1 is a front view of a movement 8 of a timepiece according to an embodiment, and FIG. 2 is a schematic diagram for briefly describing the movement 8. FIG. 2 schematically shows the relationship between components of the movement 8. In FIG. 2, the teeth of gears of the components are omitted from illustration.

First, operation in a state in which a crown is not pulled out (hereafter, a "first state") will be described with reference to FIGS. 1 and 2.

A stem 34 is a shaft-like member screwed to a crown, and rotates in the circumferential direction together with rotation of the crown. To the stem 34, a clutch wheel 81 is fitted slidably in the axial direction of the stem 34, and a winding pinion 82 is fitted rotatably in the circumferential direction of the stem 34. In the first state, when the stem 34 rotates together with rotation of the crown, the clutch wheel 81 rotates and the winding pinion 82, which meshes with the clutch wheel 81, rotates. Rotation of the winding pinion 82 is transmitted to a crown wheel 83, a ratchet wheel 84, and a barrel arbor 85 in this order, and a mainspring connected to the barrel arbor 85 is wound. In this way, the crown is configured to be capable of winding, by rotation, a mainspring connected to the barrel arbor 85 of the movement 8. This enables a first operation on the movement 8 for winding the mainspring.

Restoring force of the wound mainspring is transmitted to a barrel wheel 86, a center pinion 871, a center wheel 872, a third pinion 881, a third wheel 882, a fourth pinion 891, a fourth wheel 892, an escape pinion 901, and an escape wheel 902 in this order to cause a balance 91 to periodically oscillate. The center pinion 871 and the center wheel 872, the third pinion 881 and the third wheel 882, the fourth pinion 891 and the fourth wheel 892, and the escape pinion 901 and the escape wheel 902 are components of a center wheel and pinion 87, a third wheel and pinion 88, a fourth wheel and pinion 89, and an escape wheel and pinion 90, respectively. In order for the escape wheel 902 to oscillate the balance 91, an escapement, such as an anchor escapement, is used.

To the center wheel and pinion 87, a minute hand 73*m* is attached. The center wheel and pinion 87 is configured to make one revolution in 60 minutes. The fourth wheel and pinion 89 is configured to transmit this rotation to a second hand 73*s* (see FIG. 4) and to make one revolution in 60 seconds. Rotation of the center wheel and pinion 87 is transmitted from a cannon pinion (not shown), which operates together with the center wheel 872, via a minute wheel and pinion 92 to an hour wheel 93. To the hour wheel 93, an hour hand 73*h* is attached. The hour wheel 93 is configured to make one revolution in 12 hours.

Next, operation in a state in which the crown is pulled out (hereafter, a "second state") will be described.

In the second state, the clutch wheel 81 does not mesh with the winding pinion 82 but with a setting wheel 94. In the second state, when the stem 34 rotates together with rotation of the crown, rotation of the stem 34 is transmitted to the clutch wheel 81, the setting wheel 94, an intermediate setting wheel 95, and a minute wheel 922 in this order to rotate the hour wheel 93, to which the hour hand 73*h* is attached, and the cannon pinion. Rotation of the cannon pinion rotates the center wheel and pinion 87, to which the minute hand 73*m* is attached. In this way, the crown is configured to be capable of rotating, by rotation, the hour hand 73*h* and the minute hand 73*m* connected to the movement 8. This enables a second operation on the movement 8 for setting the time. The hour hand 73*h* and the minute hand 73*m* are examples of the hand.

Figure 3A:
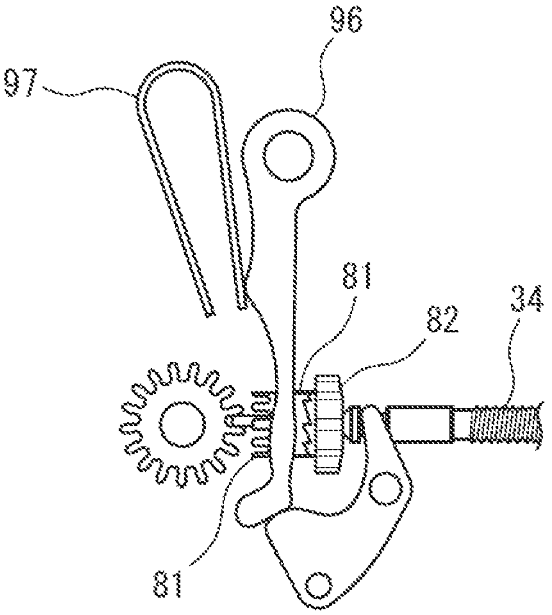
FIG. 3A is a schematic diagram for explaining operation depending on the position of a pull-out crown in a first state.
Figure 3B:
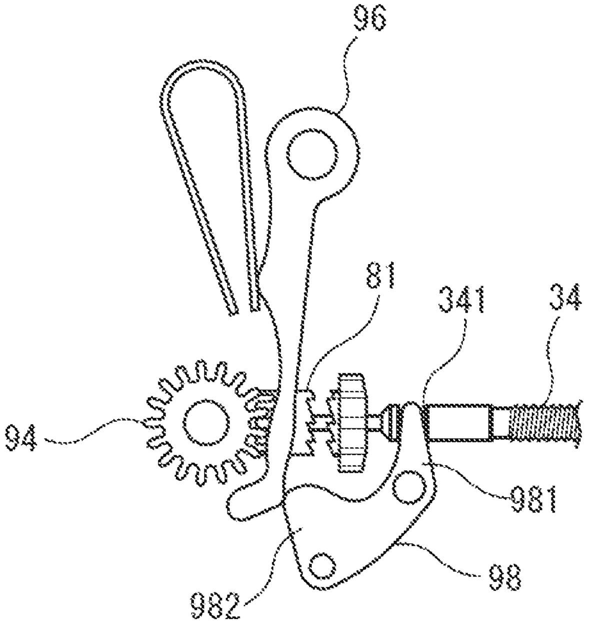
FIG. 3B is a schematic diagram for explaining operation depending on the position of a pull-out crown in a second state.

FIGS. 3A and 3B are schematic diagrams for explaining operation depending on the position of the pull-out crown. FIG. 3A is a schematic diagram of the first state. In the first state, the clutch wheel 81 receives elastic force of a yoke spring 97 via a yoke 96 to be pushed toward the winding pinion 82, meshing with the winding pinion 82. In the first state, rotary power of the stem 34 is transmitted to the winding pinion 82.

FIG. 3B is a schematic diagram of the second state. In the second state, a head 981 of a setting lever 98 inserted into a groove 341 of the stem 34 is pulled out together with the stem 34, and a bottom 982 of the setting lever 98 pushes the yoke 96 toward the setting wheel 94. In the second state, the clutch wheel 81 meshes with the setting wheel 94, causing rotary power of the stem 34 to be transmitted to the setting wheel 94.

Note that the above brief description of the movement 8 is for explaining operation of the crown, and that another movement different from the movement 8 may be used for the timepiece according to the embodiment.

Figure 4:
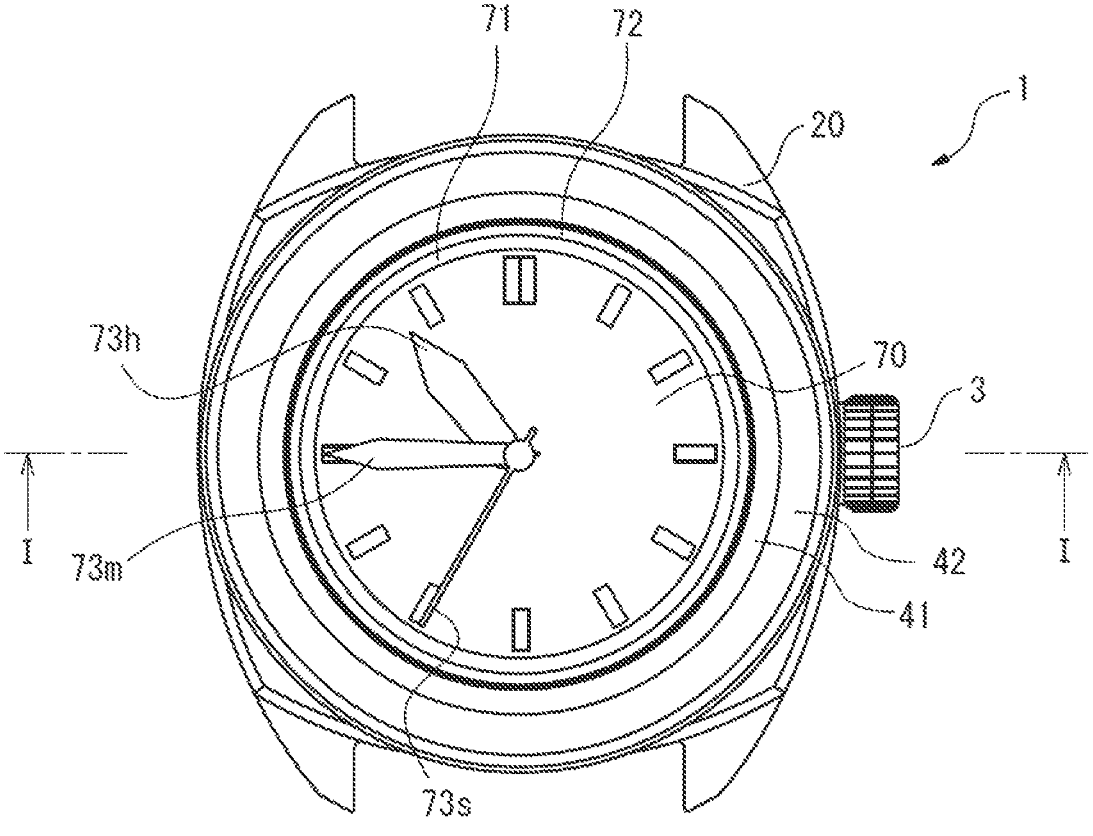
FIG. 4 is a top view of a timepiece 1.
Figure 5:
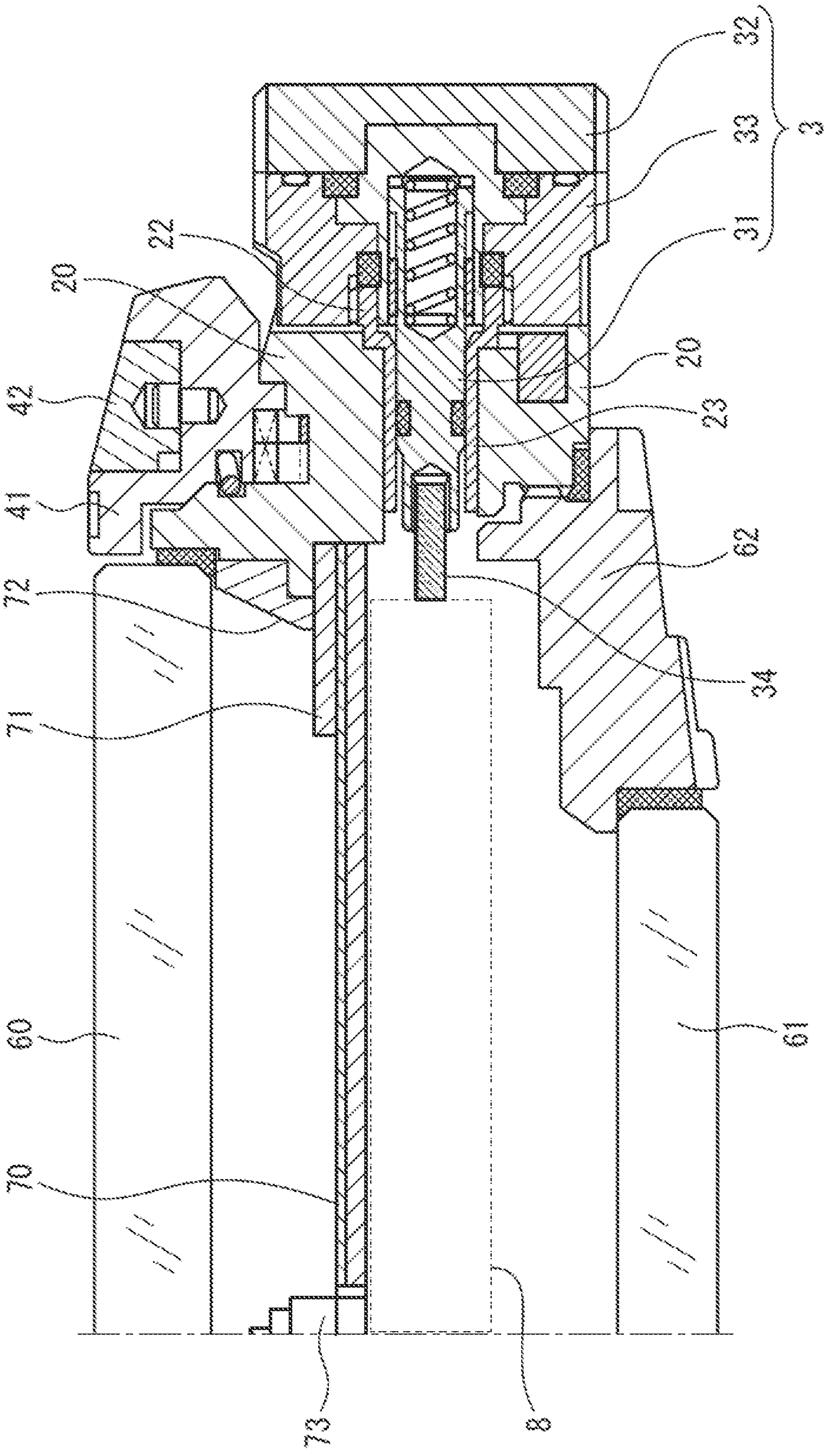
FIG. 5 is a cross-sectional view of the timepiece 1.
Figure 6:
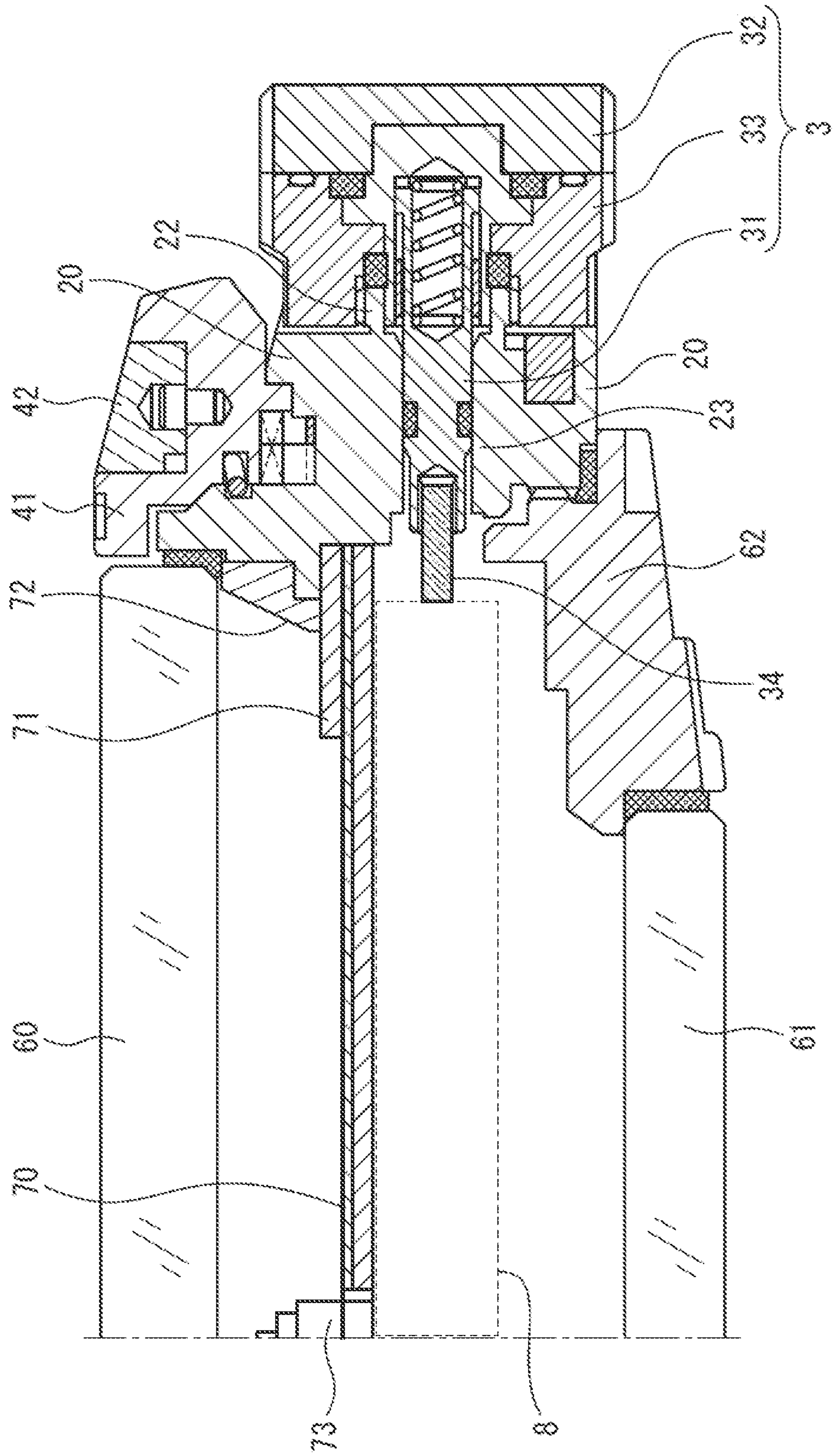
FIG. 6 is a cross-sectional view of the timepiece 1.

FIG. 4 is a top view of a timepiece 1 according to the first embodiment, and FIG. 5 shows a portion of a cross section taken along line I-I in FIG. 4. In FIG. 5, the hour hand 73*h*, the minute hand 73*m*, and the second hand 73*s* are omitted from illustration. The timepiece 1 includes an outer case 20, a crown 3, a bezel 41 and 42, and a protective glass 60. Below the protective glass 60, a dial 70, a first dial ring 71, a second dial ring 72, and a rotating shaft 73 are provided. The hour hand 73*h*, the minute hand 73*m*, and the second hand 73*s* are set to the rotating shaft 73 and rotates together with the hour wheel 83, the center wheel and pinion 87, and the fourth wheel and pinion 89, respectively. The first dial ring 71 and the second dial ring 72 are annular members covering the periphery of the dial 70. Below the dial 70 is incorporated the movement 8 connected to the rotating shaft 73 to drive the hands, i.e., the hour hand 73*h*, the minute hand 73*m*, and the second hand 73*s* (regarding the components of the movement 8, see FIGS. 1 and 2). On the underside of the timepiece 1, a case back 61 and a case back holder 62 are provided. The side surface of the outer case 20 has a crown hole 23 through a portion thereof. Into the crown hole 23, a cylindrical pipe 22 is inserted and attached by fixing. The pipe 22 is an example of the engagement member. In the example shown in FIG. 5, the pipe 22 is formed separately from the outer case 20. As shown in FIG. 6, the pipe 22 may be formed integrally with the outer case 20. For example, the pipe 22 may be formed together with the outer case 20 by injection molding. The following description will be given by assuming that the pipe 22 is formed separately from the outer case 20.

The crown 3 enables operation on the movement 8. For example, the crown 3 transmits rotary power to the movement 8. To achieve this, the crown 3 includes a shaft part 31, an operation part 32, and an engagement part 33. The shaft part 31 is inserted into the pipe 22. The shaft part 31 has one end connected to the movement 8 via the stem 34, and transmits rotary power. The operation part 32 is provided at the other end of the shaft part 31 and operated to enable the shaft part 31 to move in the axial direction and rotate in the circumferential direction. The engagement part 33 is a cylindrical member disposed between the operation part 32 and the pipe 22. The engagement part 33 restricts movement of the operation part 32 in the axial direction when engaged with the pipe 22, and rotatably holds the operation part 32 whether or not engaged with the pipe 22. In the following, the state in which the engagement part 33 is engaged with the pipe 22 and thereby restricts movement of the operation part 32 in the axial direction will be referred to as a "locked state."

Figure 7:
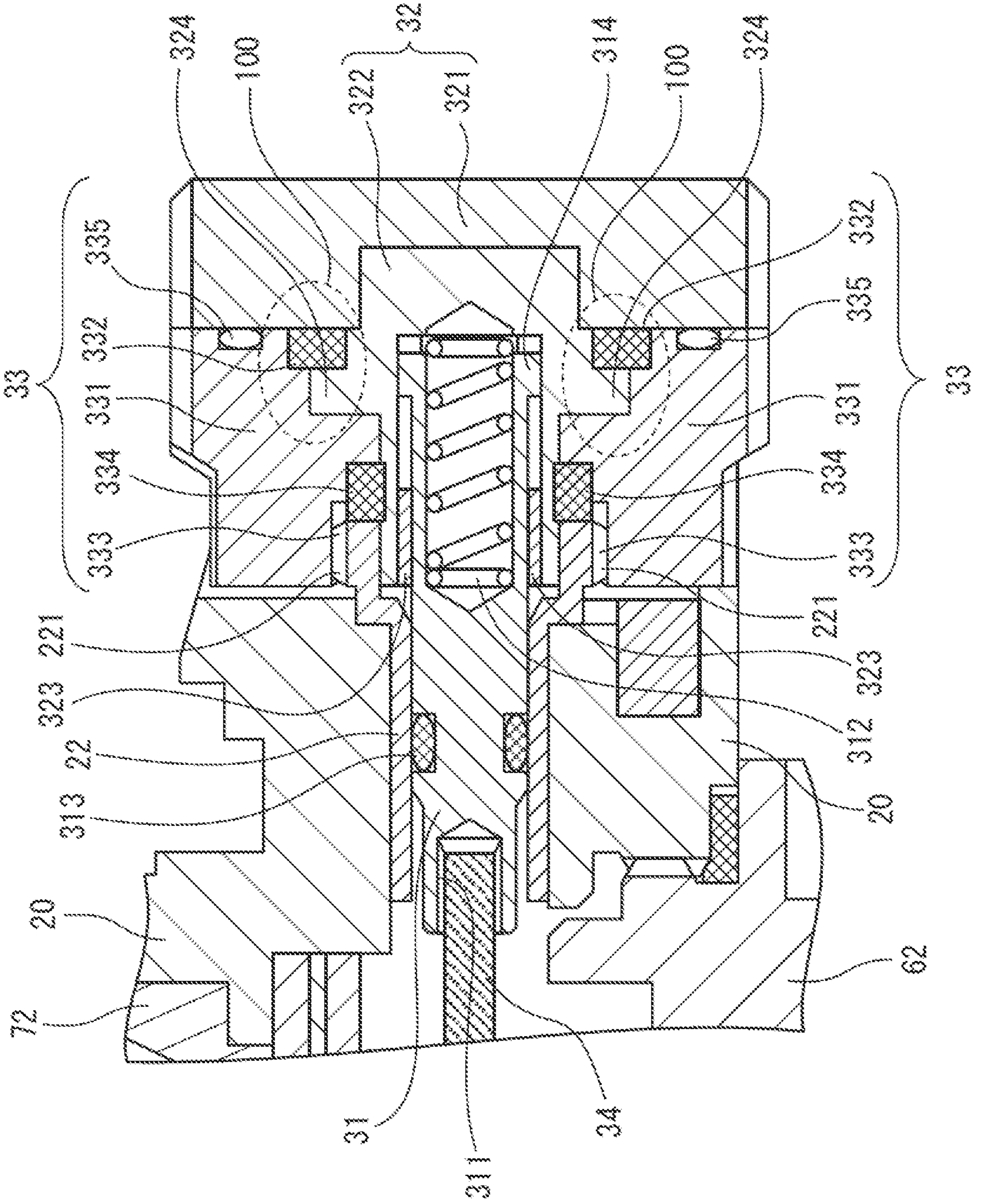
FIG. 7 is a cross-sectional view of a crown 3 of the timepiece 1 and its vicinity.
Figure 8:
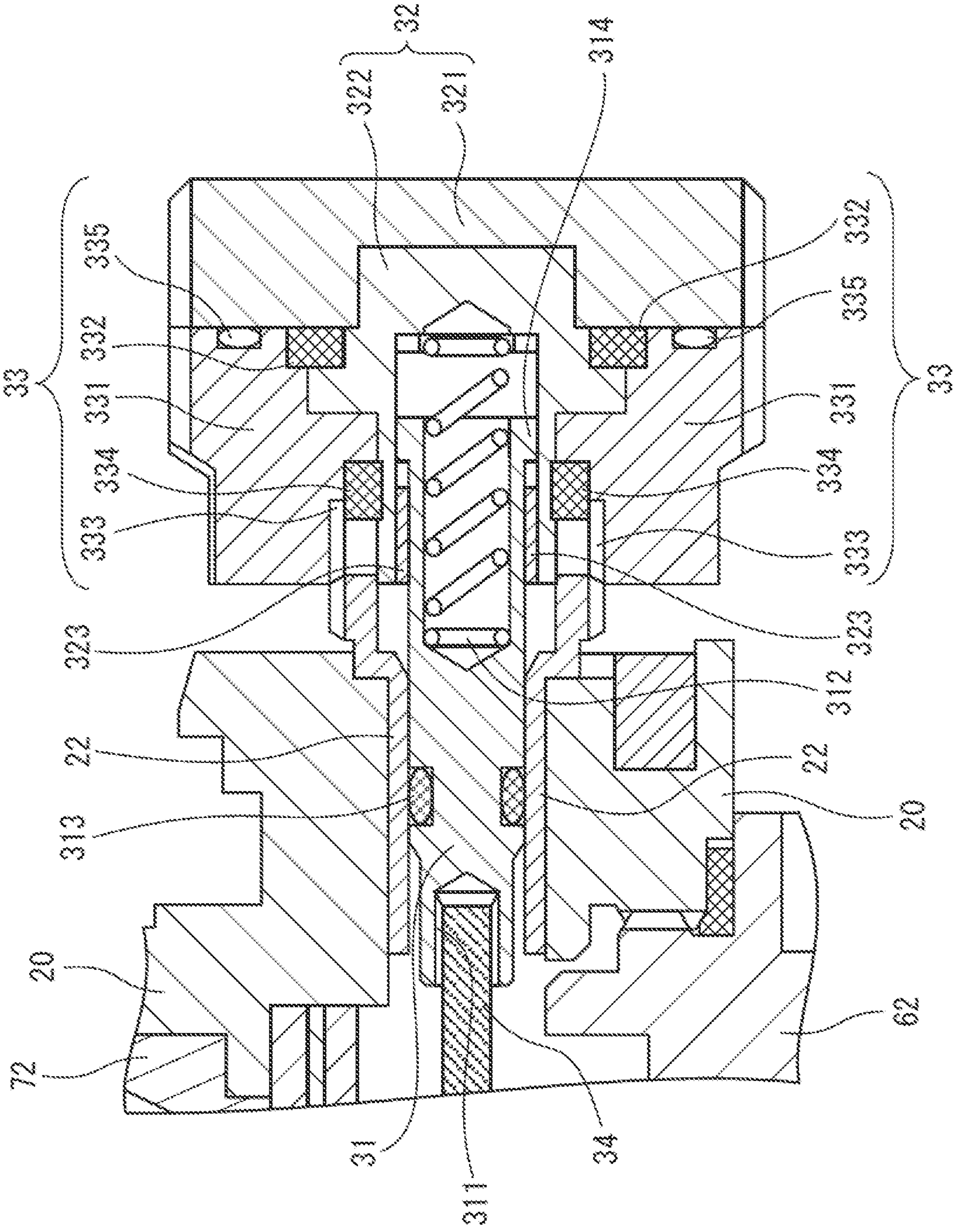
FIG. 8 is a cross-sectional view of a crown 3 of the timepiece 1 and its vicinity.
Figure 9:
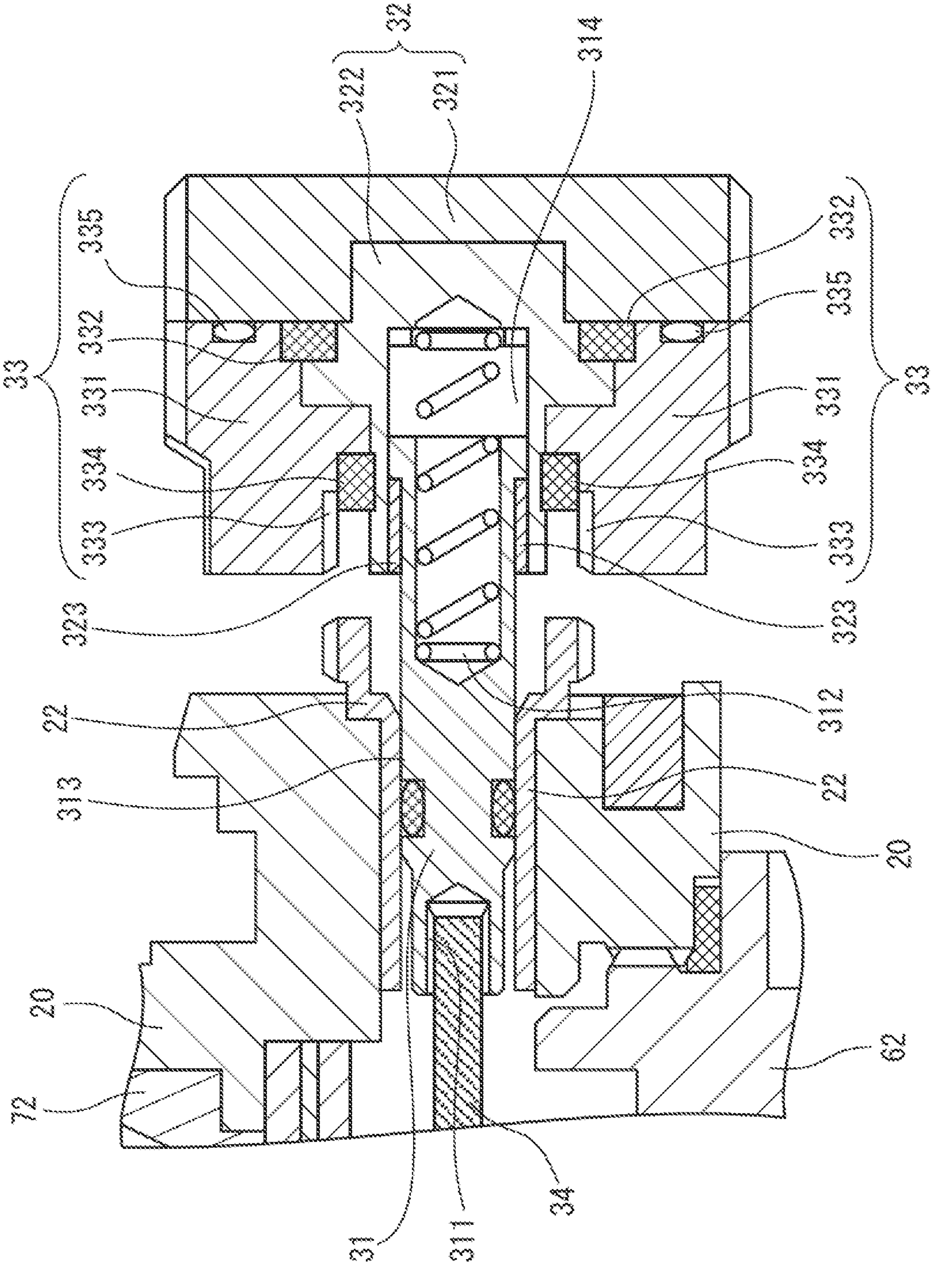
FIG. 9 is a cross-sectional view of a crown 3 of the timepiece 1 and its vicinity.

FIGS. 7 to 9 are enlarged views of the crown 3 and its vicinity in a cross section of the timepiece 1. The following describes details of the structure of the crown 3, using FIGS. 7 to 9.

FIG. 7 is a cross-sectional view in the locked state. As shown in FIG. 7, the shaft part 31 is inserted into the pipe 22, which is inserted into the crown hole 23 formed in the outer case 20. The outer circumference of the shaft part 31 and the inner circumference of the pipe 22 are both circular, and the shaft part 31 is rotatable in the circumferential direction when inserted into the pipe 22. The end of the shaft part 31 has a recess 311 into which the stem 34 is inserted. The stem 34 is fixed to the recess 311, for example, by screwing and thereby connected to the shaft part 31. The stem 34 may be formed integrally with the shaft part 31. Around the shaft part 31, a waterproofing member 313, such as a gasket, may be provided.

The operation part 32 includes a head 321 and an inner cylinder 322. The head 321 is fixed to the inner cylinder 322, into which part of the shaft part 31 is inserted. The inner circumference of the inner cylinder 322 and the outer circumference of a flange 314 of the shaft part 31 each have a square shape of substantially the same diameter, and the inner cylinder 322 and the shaft part 31 rotate in the circumferential direction together. More specifically, rotation of the head 321 rotates the inner cylinder 322 fixed to the head 321 and rotates the shaft part 31 together. In this way, the operation part 32 enables the shaft part 31 to rotate in the circumferential direction.

The engagement part 33 includes a body 331 and a holder 332. The body 331 fixed to the holder 332 is coupled to a flange 324 of the inner cylinder 322 to form a fastening structure 100 between the inner circumference of the engagement part 33 and the operation part 32. More specifically, the holder 332 is fixed to the inner circumference of the body 331, and thereby the engagement part 33 has a portion whose inner circumference has a larger diameter. The fastening structure 100 is formed by coupling to this larger-diameter portion the flange 324, whose outer circumference has a larger diameter in the inner cylinder 322. With the fastening structure 100, the engagement part 33 holds the operation part 32 so that it is rotatable relative to the engagement part 33. Further, the body 331 and the holder 332 are not fixed to the inner cylinder 322, and are rotatable relative to the inner cylinder 322. This makes the engagement part 33 operate together with the operation part 32 in the axial direction of the shaft part 31 and hold it rotatably in the circumferential direction. Additionally, an internal thread structure 333 provided on the inner circumference of the body 331 is screwed to an external thread structure 221 of the pipe 22. This makes the engagement part 33 restrict movement of the operation part 32 in the axial direction when engaged with the pipe 22. Instead of the external thread structure 221 and the internal thread structure 333, any structure that enables engagement may be used. Additionally, waterproofing members 334 and 335, such as gaskets, may be provided between the body 331 and the inner cylinder 322 and between the body 331 and the head 321, respectively.

In the locked state, the shaft part 31 is at a first position where it is not pulled out, as shown in FIG. 7. In the locked state also, the operation part 32 is rotatably held by the engagement part 33. Thus the crown 3 is configured to be capable of winding, by rotation, the mainspring connected to the barrel arbor 85 of the movement 8 in the locked state. The mainspring can be wound by a user of the timepiece 1 rotating the operation part 32.

FIG. 8 is a cross-sectional view in the first state. Rotating the engagement part 33 in the locked state shown in FIG. 7 releases screwing between the internal thread structure 333 of the engagement part 33 and the external thread structure 221 of the pipe 22, resulting in the first state shown in FIG. 8. In the first state, the engagement part 33 operates together with the operation part 32 in the axial direction. Release of screwing moves the operation part 32 and the engagement part 33 in the direction away from the pipe 22, but elastic force of a spring 312 embedded in the shaft part 31 keeps the shaft part 31 in the first position where it is not pulled out, as in the locked state. In other words, the position of the shaft part 31 relative to the pipe 22 does not change from that in the locked state.

In the first state, a user of the timepiece 1 can wind the mainspring by rotating the operation part 32. Since the engagement part 33 operates together with the operation part 32 in the axial direction, the user of the timepiece 1 can pull out the operation part 32 and the engagement part 33.

FIG. 9 is a cross-sectional view in the second state. When the operation part 32 and the engagement part 33 are pulled out in the first state, the shaft part 31 is pulled out by the flange 314 of the shaft part 31 being caught by the inner circumference 323 of the inner cylinder 322. Then, the position of the shaft part 31 relative to the pipe 22 changes in the direction away from the outer case 20. In other words, the shaft part 31 moves to a second position where it is pulled out. This results in the second state and enables the second operation for setting the time.

As described above, the engagement part 33 of the timepiece 1 is disposed between the pipe 22 and the operation part 32 and engaged with the pipe 22 to restrict movement of the operation part 32 in the axial direction of the shaft part 31, and rotatably holds the operation part 32 whether or not engaged with the pipe 22. Thus the timepiece 1 enables the crown 3 to be rotated even when it is in the locked state. Additionally, the engagement part 33 disposed between the pipe 22 and the operation part 32 eliminates the need for including another member outside the crown 3, and does not cause constraints of design.

Second Embodiment

A timepiece according to a second embodiment differs from the timepiece 1 according to the first embodiment in the structure of the operation part 32 and the engagement part 33 of the crown 3. The following describes a crown 3*a* of the timepiece according to the second embodiment, using FIG. 10.

Figure 10:
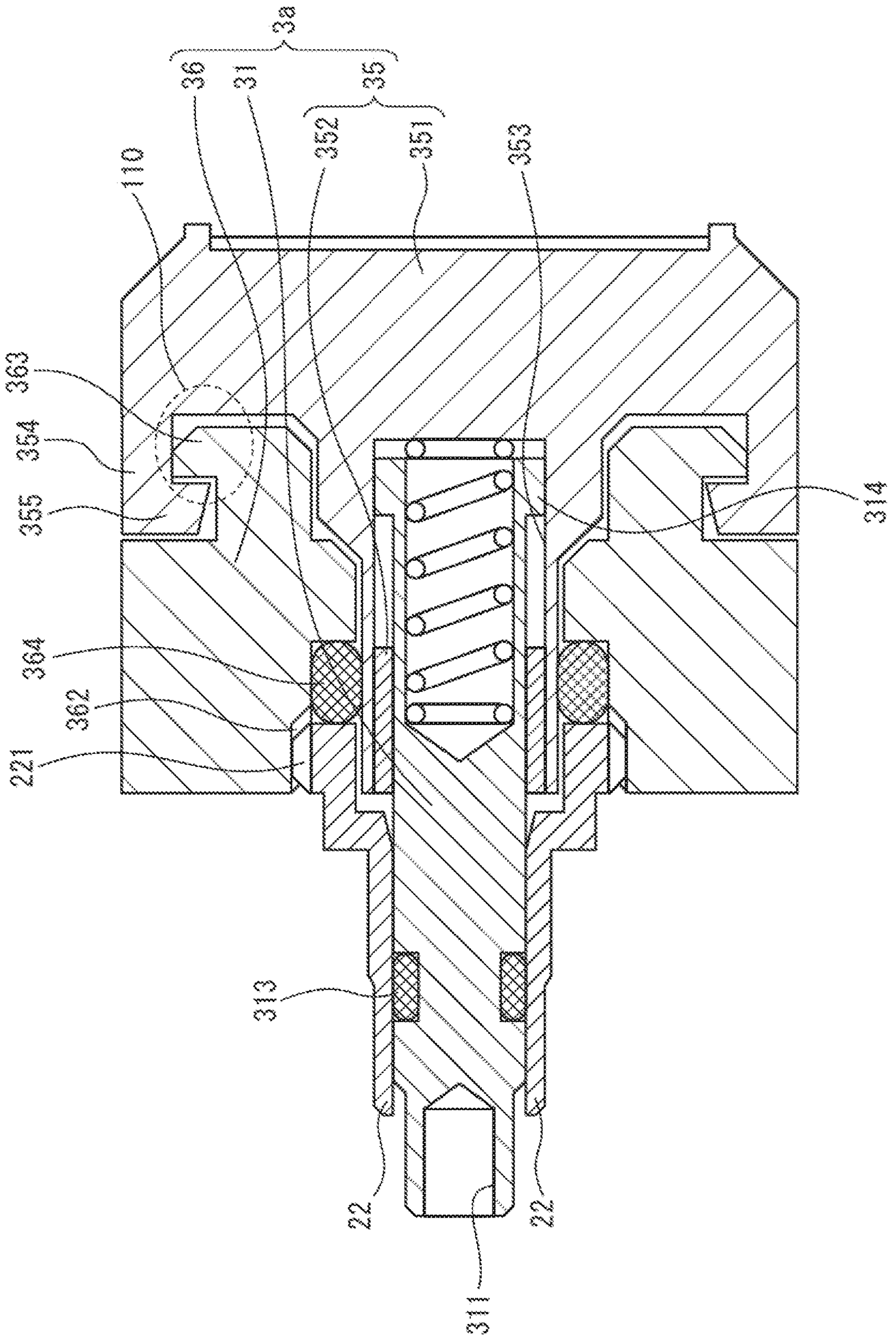
FIG. 10 is a cross-sectional view of a crown 3*a* of a timepiece and its vicinity.

FIG. 10 is a cross-sectional view of the crown 3*a* of the timepiece according to the second embodiment and its vicinity. The crown 3*a* according to the second embodiment includes a shaft part 31, an operation part 35, and an engagement part 36. The cross section shown in FIG. 10 is taken along the same line as the cross sections shown in FIGS. 7 to 9, but in FIG. 10, the outer case 20, the stem 34, the case back holder 62, and the second dial ring 72, which are shown in FIGS. 7 to 9, are omitted from illustration. The same reference numerals are assigned to components similar to those in the first embodiment, and explanation thereof will be omitted as appropriate.

The operation part 35 includes a head 351 and an inner cylinder 352. The shaft part 31 is inserted into a recess 353 of the head 351. The inner circumference of the recess 353 and the outer circumference of the flange 314 of the shaft part 31 each have a square shape of substantially the same diameter, and the head 351 and the shaft part 31 are configured to rotate in the circumferential direction together. The head 351 has a skirt structure 354 extending from its outer circumference toward the outer case. The inner cylinder 352 is a cylindrical member into which the shaft part 31 is inserted, and is fixed to the head 351.

The engagement part 36 is a cylindrical member into which part of the operation part 35 is inserted, and has an internal thread structure 362 on its inner circumference. The engagement part 36 has such a shape as to fit in the skirt structure 354 of the operation part 35. The internal thread structure 362 is a structure that can be screwed to the external thread structure 221 of the pipe 22. Between the engagement part 36 and the inner cylinder 352, a waterproofing member 364, such as a gasket, may be provided.

The engagement part 36 has an edge 363 hooked to an edge 355 of the operation part 35 to form a barbed structure 110 between the outer circumference of the engagement part 36 and the operation part 35. More specifically, the engagement part 36 has the edge 363 whose outer circumference has a larger diameter. The barbed structure 110 is formed by hooking the edge 363 to a portion of the skirt structure 354 whose inner circumference has a larger diameter. With the barbed structure 110, the engagement part 36 rotatably holds the operation part 35. In the locked state, the engagement part 36 is engaged with the pipe 22 to restrict movement of the operation part 35 in the axial direction. Additionally, the engagement part 36 rotatably holds the operation part 35 whether or not engaged with the pipe 22.

REFERENCE SIGNS LIST

1 TIMEPIECE
20 OUTER CASE
3 CROWN
31 SHAFT PART
32 OPERATION PART
33 ENGAGEMENT PART

The invention claimed is:

1. A timepiece comprising:

an outer case having a movement therein, the outer case having a crown hole through a portion thereof;

an engagement member connected to the outer case; and a crown, wherein the crown comprising:

a shaft part inserted into the crown hole and connected to the movement;

an operation part provided at the other end of the shaft part, holding the shaft part movably along an axial direction of the shaft part and enabling the shaft part to rotate in a circumferential direction; and an engagement part disposed between the engagement member and the operation part, restricting movement of the operation part in the axial direction when engaged with the engagement member, and rotatably holding the operation part whether or not the engagement part is engaged with the engagement member, wherein the engagement part is a cylindrical member into which the shaft part is inserted and with a structure provided on an inner circumference thereof, the structure enabling engagement with the engagement member.

2. The timepiece according to claim 1, wherein the engagement member is formed integrally with the outer case.

3. The timepiece according to claim 1, wherein the engagement member is formed separately from the outer case.

4. The timepiece according to claim 1, wherein the engagement part engages with the engagement member by screwing.

5. The timepiece according to claim 1, wherein the engagement part rotatably holds the operation part with a fastening structure formed between the inner circumference of the engagement part and the operation part.

6. The timepiece according to claim 1, wherein the engagement part rotatably holds the operation part with a barbed structure formed between an outer circumference of the engagement part and the operation part.

7. The timepiece according to claim 1, wherein the crown is configured to be capable of winding a mainspring of the movement by rotation when the engagement part is engaged with the engagement member, and configured to be capable of rotating, by rotation, a hand connected to the movement when engagement between the engagement part and the engagement member is released and the crown is pulled out.

* * * * *